(12) United States Patent
DePierri et al.

(10) Patent No.: US 8,124,019 B2
(45) Date of Patent: Feb. 28, 2012

(54) CLOG-RESISTANT PUMP ASSEMBLY FOR SLURRY LOOP REACTOR

(75) Inventors: Robert G. DePierri, Baton Rouge, LA (US); Norman F. Cook, Jackson, LA (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 108 days.

(21) Appl. No.: 12/829,590

(22) Filed: Jul. 2, 2010

(65) Prior Publication Data
US 2011/0046322 A1  Feb. 24, 2011

Related U.S. Application Data

(60) Provisional application No. 61/235,893, filed on Aug. 21, 2009.

(51) Int. Cl.
*F04D 29/54* (2006.01)
*B01J 19/18* (2006.01)
*C08F 2/01* (2006.01)

(52) U.S. Cl. .......... 422/132; 526/64; 415/183; 415/191; 415/121.1

(58) Field of Classification Search .................. 422/132; 526/64; 415/183, 191, 121.1
See application file for complete search history.

(56) References Cited

U.S. PATENT DOCUMENTS

| 5,385,447 | A |  | 1/1995 | Geister |
| 5,417,930 | A |  | 5/1995 | McDonald, Jr. et al. |
| 5,785,495 | A |  | 7/1998 | Springer et al. |
| 5,967,760 | A | * | 10/1999 | Howie et al. .................... 417/80 |
| 7,014,821 | B2 |  | 3/2006 | Hottovy et al. |
| 2004/0132928 | A1 | * | 7/2004 | Hottovy et al. ................. 526/64 |

FOREIGN PATENT DOCUMENTS

| EP | 0 512 190 | 11/1992 |
| EP | 0 623 750 | 11/1994 |
| FR | 2 628 484 | 9/1989 |

* cited by examiner

*Primary Examiner* — William Cheung
(74) *Attorney, Agent, or Firm* — Frank E. Reid

(57) ABSTRACT

The pump assembly includes an impeller rotatably mounted in a pipe of the reactor having blades that generate a flow of fluid slurry through the pipe, a nosecone protruding in an upstream direction in front of the impeller blades that rotates along with the blades, and a plurality of stationary guide vanes connected to the housing upstream of the impeller blades and having free ends that are radially spaced apart from the nosecone. The leading edges of the stationary vanes are shaped to direct any stringy material into the radial gaps between the free ends of the stationary vanes and the rotating nose cone to be shredded and thus prevent fouling and clogging of the pump assembly when such stringy material is generated during the polymerization process.

22 Claims, 5 Drawing Sheets

CLOG-RESISTANT PUMP ASSEMBLY FOR SLURRY LOOP REACTOR

CROSS REFERENCE TO RELATED APPLICATIONS

This application claims the benefit of prior U.S. provisional application Ser. No. 61/235,893 filed Aug. 21, 2009 which is hereby incorporated by reference in its entirety.

FIELD OF THE INVENTION

This invention generally relates to flow pumps for circulating a fluid slurry in a loop reactor used for polymerization, and is specifically concerned with a clog-resistant pump assembly having a rotating nosecone protruding from the pump impeller that is surrounded by stationary guide vanes. The pump assembly resists clogging by cutting stringy material formed in the slurry in an annular gap defined between the rotating nosecone and the stationary vanes.

BACKGROUND OF THE INVENTION

Polyolefins such as polyethylene and polypropylene may be prepared by particle form and bulk polymerization, also referred to as slurry polymerization. In this technique, feed materials such as a monomer and catalyst are fed into the pipes of a loop reactor formed from an array of vertically or horizontally oriented pipes interconnected by elbow pipes which are typically semicircular or arcuate in shape, but which may have a horizontally-oriented section. The monomer polymerizes to form a fluid slurry formed from particles of polyolefin entrained in a liquid medium. The fluid slurry is periodically and/or continuously withdrawn from the reactor, depending on the particular process used, and routed to a separation station where the solid polyolefin particles are removed to form the final product.

In a loop polymerization operation, the fluid slurry is circulated around the loop reactor using one or more axial flow pumps. The pumps have impellers (which are also sometimes referred to as propellers in the art) that are rotatably mounted within the pipes of the reactor, and provide the motive force for circulation of the fluid slurry. The pipes are typically covered with heat exchanger jackets which cool the slurry. The flow pumps are typically (but not necessarily) located in the lower elbow pipes that conduct the slurry to the vertically oriented pipes of the reactor.

In order to maximize catalyst and reactor productivity in such loop reactors, the axial flow pumps must be capable of circulating at a high flow rate, a high concentration of solid polyolefin particles. A higher slurry velocity allows for a higher solids content, which maximizes residence time and therefore catalyst and reactor productivity.

One technique for increasing slurry circulation velocity uses a set of stationary guide vanes immediately upstream of the impeller of the pump. The guide vanes are shaped to impart a rotation to the slurry that is opposite in direction to the rotation of the impeller blades, thus increasing the rotational speed of the impeller with respect to the slurry and thereby increasing head and flow. In one design, the stationary guide vanes are mounted between the inner diameter of one of the elbow pipes of the loop reactor, and a stationary nosecone located immediately upstream of the impeller hub of the pump.

While such a guide vane design is capable of significantly improving the slurry circulation velocity through the pipes of the loop reactor, the inventors have observed that, under certain circumstances, clogging and fouling can occur on the vane edges in such a design. In particular, the inventors have observed that stringy material formed during upsets of the polymerization process can collect and bind on the leading edges of the vanes. Once such stringy material begins to collect on the edges of the vanes, the resulting deposits form sites on the vanes that promote accumulation of solid material. The resulting negative feedback cycle can cause all of the space between two or more adjacent vanes to become completely clogged, necessitating a shut-down of the loop reactor in order for the vanes to be cleared of all of the accumulated solid material.

Clearly, there is a need for a loop reactor pump assembly that is resistant to clogging when stringy material is produced during upsets in the polymerization process.

SUMMARY OF THE INVENTION

To solve such fouling and clogging problems, the pump assembly of the invention generally comprises an impeller rotatably mounted in a pipe of the reactor having blades that generate a flow of fluid slurry through the pipe, a nosecone protruding in an upstream direction in front of the impeller blades that rotates along with the blades, and a plurality of stationary guide vanes connected to the reactor pipe upstream of the impeller blades and having free ends that are radially spaced apart from said nosecone. The leading edges of the stationary vanes are shaped to direct any stringy material that impinges them into the radial gaps between the free ends of the stationary vanes and the rotating nose cone. These radial gaps form fluidic pinch points that cut stringy material as a result of both a pinching force generated by the tapered leading edges of the vanes, and a shearing force generated by the relative motion between the stationary free ends of the vanes and the rotating nosecone. The nosecone can optionally be grooved to increase cutting efficiency by creating additional pinch points between the nosecone and stationary vans. The resulting cutting action prevents fouling and clogging of the pump assembly when stringy material is generated during the polymerization process as a result of upsets in the polymerization process carried out in the loop reactor.

The leading edges of the stationary vanes may be substantially straight and tapered between about 15° and 60° relative to a central axis of the pipe. The radial extent of the gap between the nosecone and the free ends of the vanes is preferably less than about three sixteenths 0.1875 inches (4.7 mm), and preferably more than about one sixteenth (0.0625) inches (1.6 mm). Moreover, the nosecone may include grooves on a surface opposite from said free ends of said vanes to draw and shred stringy material through the fluidic pinch points defined by the gaps. Preferably, the grooves are spiral or helically-shaped so as to draw stringy material through the gaps in much the same manner as drill flutes to increase the effectiveness of the cutting action.

In the preferred embodiment, the stationary guide vanes are shaped to impart a rotation direction to said fluid slurry that is opposite in direction to a rotation direction of the impeller blades to increase the flow velocity of the fluid slurry. Additionally, the nosecone may be formed in part by a portion of said impeller hub upstream of said impeller blades and may include a rounded front portion having a profile that promotes laminar flow of the fluid slurry toward said impeller blades.

DETAILED DESCRIPTION OF THE INVENTION

Figure 1:
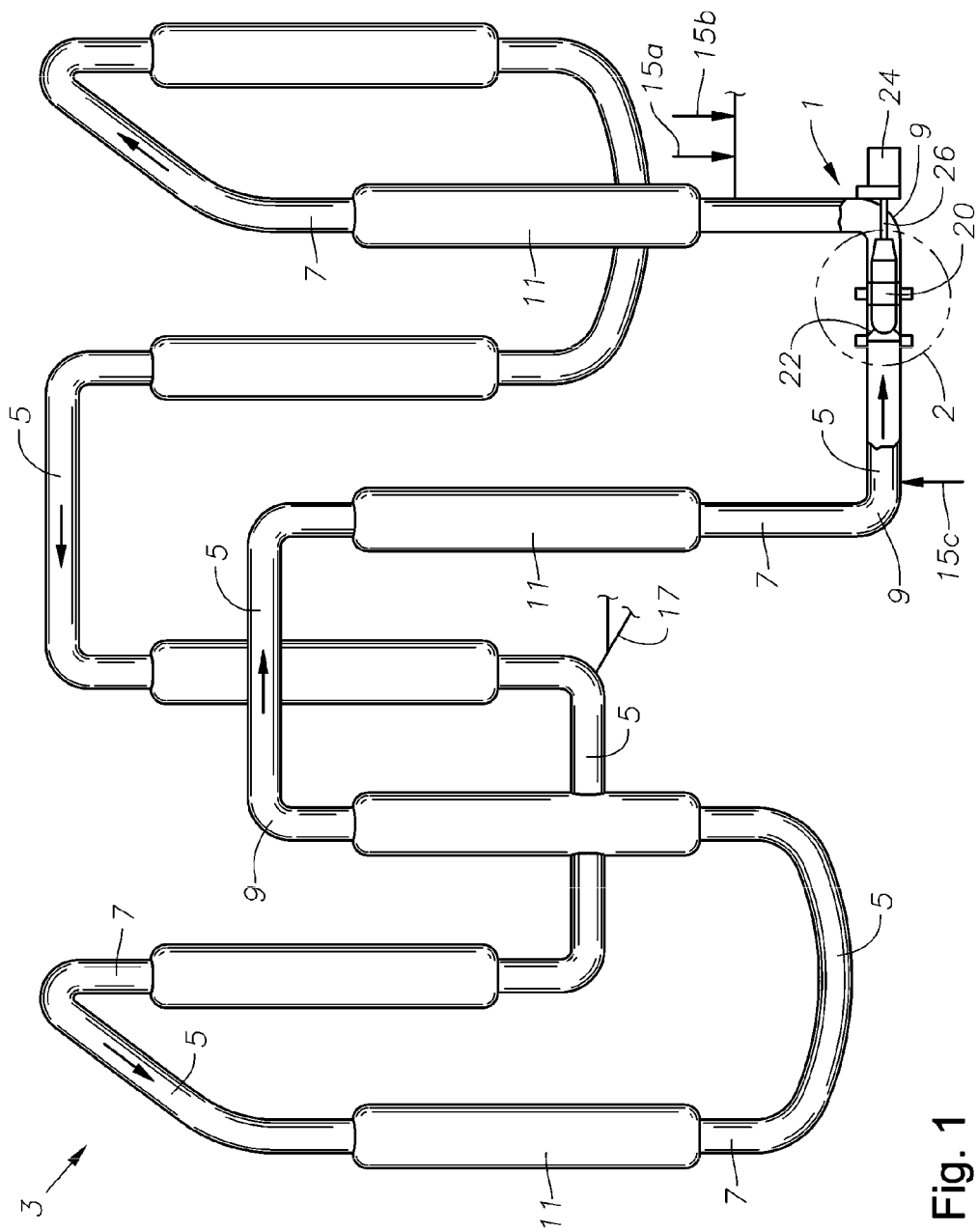
FIG. 1 is a schematic diagram of a loop reactor having a flow pump assembly in accordance with the invention installed in one of its lower elbow pipes.

With reference now to FIG. 1, wherein the reference numerals designate like components throughout all of the several Figures, the flow pump assembly 1 of the invention finds particular utility in a loop reactor 3. Such a reactor 3 is formed from an arrangement of elbow pipes 5 and vertical or horizontal pipes 7 interconnected by joints 9. The vertical pipes are enshrouded with heat exchanger jackets 11 as shown. Inlets 15a, 15b and 15c are provided in the elbow pipes 5 to provide a stream of monomer, diluent (which can be one and the same), catalyst, respectively. An outlet mechanism 17 is further provided in one of the horizontal pipes for periodic and/or continuous discharge of reactor slurry. In operation, the flow pump assembly 1 circulates a mixture of monomer(s), diluent(s) and catalyst around the elbow and vertical pipes 5, 7 in the direction indicated by the flow arrows. Periodically and/or continuously, one or more valves of the outlet mechanism 17 is opened to route the reactor slurry in the lower elbow pipes 5 to another processing station, where the particulate polyolefin is separated from the liquid component of the slurry.

Figure 2:
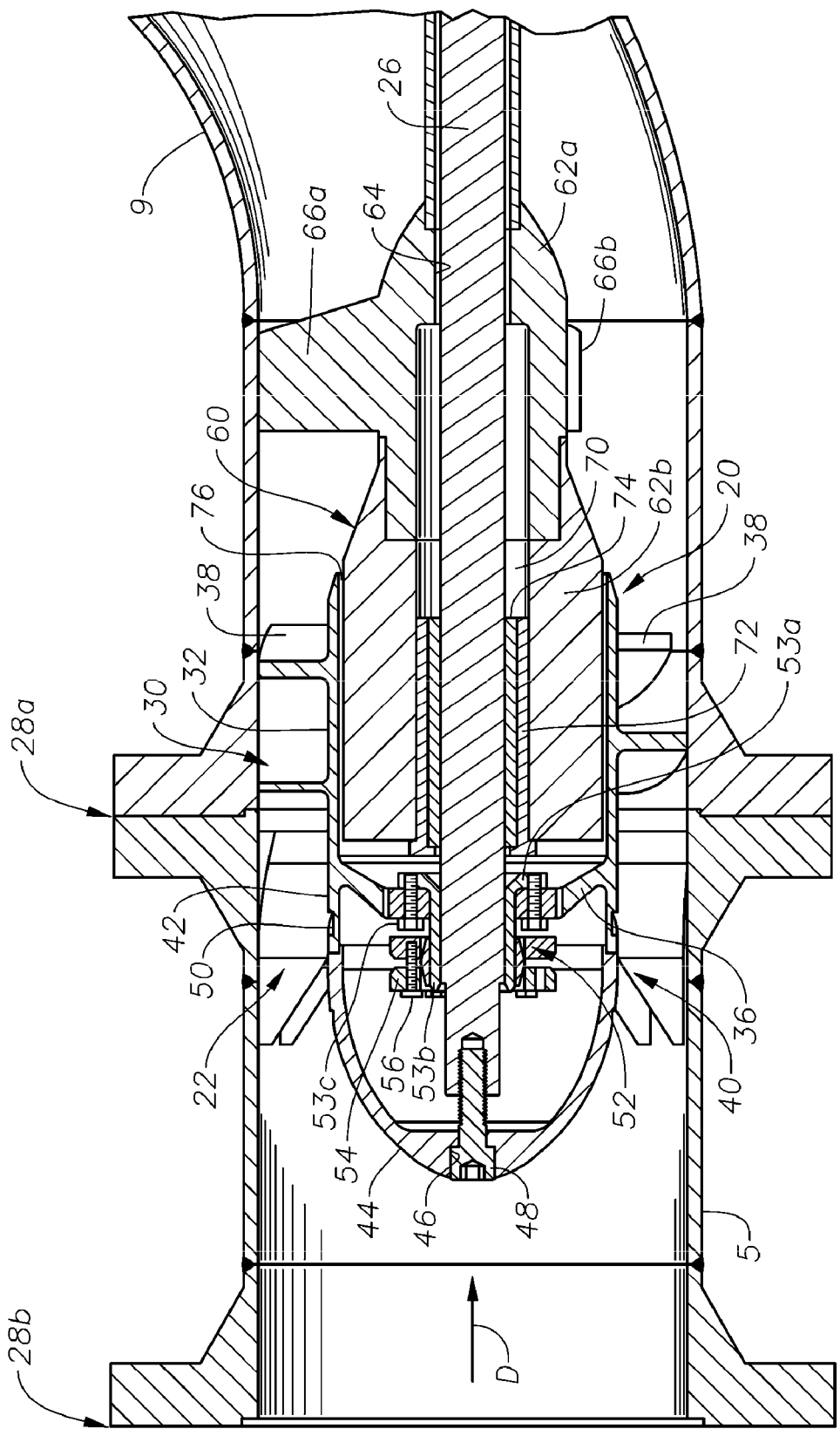
FIG. 2 is an enlargement of the potion of FIG. 1 circled in phantom, illustrating a side cross sectional view of the flow pump assembly of the invention.

With reference now to FIGS. 1 and 2, one or more flow pump assemblies 1 includes an impeller assembly 20, an arrangement of stationary guide vanes 22 surrounding the leading end of the impeller assembly 20, a drive motor 24 disposed outside of the pipes of the loop reactor 3 for rotating the impeller of the impeller assembly 20, and a drive shaft 26 connecting the output of the motor 24 to the impeller of the impeller assembly 20. Pipe joints 28a, 28b are provided in the pipe 5 at either end of the impeller assembly 20 to facilitate installation and maintenance procedures on the impeller assembly 20.

Figure 3A:
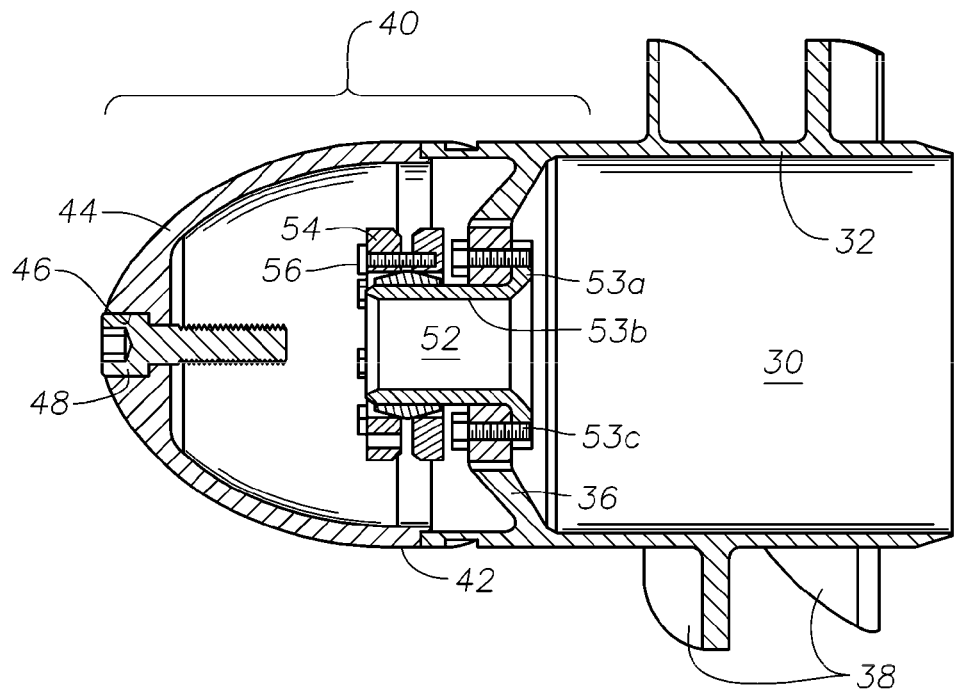
FIGS. 3A and 3B are a side cross sectional view and a side view of the impeller and nosecone of the flow pump assembly.
Figure 3B:
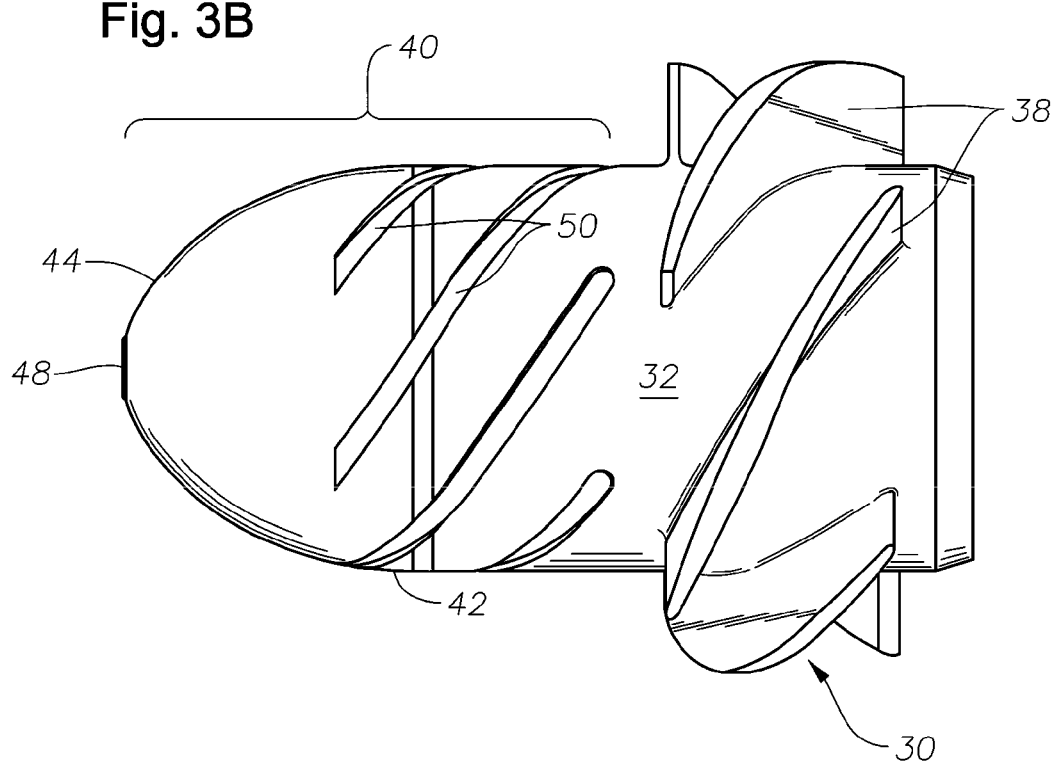

With reference to FIGS. 2, 3A and 3B, the impeller assembly 20 includes an impeller 30 having a tubular hub 32. A frustro-conical mounting plate 36 is integrally formed around the inner diameter of the hub 32 toward its leading end. A plurality of radially-extending impeller blades 38 are integrally formed around the outer diameter of the hub 32 toward its trailing end. In the preferred embodiment, the impeller 30 is formed from aluminum. The impeller assembly 20 further includes a nosecone 40 having a cylindrical base portion 42 formed between the leading end of the hub 32 and the impeller blades 38, and a rounded, bullet-shaped front portion 44 that caps the cylindrical base portion 42. The curved profile of the front portion 44 is selected to promote laminar flow of the slurry through the impeller assembly. In the preferred embodiment, an elliptical profile is used for this purpose. A bolt hole 46 and mounting bolt 48 allow the rounded front portion 44 to be secured to the leading end of the drive shaft 26, as shown in FIG. 2. A plurality of spiral flutes or grooves (best seen in FIG. 3B) extend between the trailing end of the front portion 44 and the leading end of the cylindrical base portion 42 of the nosecone 40 for a purpose that will be described in detail hereinafter. The diameter of the trailing end of the rounded front portion 44 and the leading end of the cylindrical base portion 42 are the same such that (with the exception of the spiral grooves 50) a smooth, continuous cylindrical surface is maintained around the exterior surface of the nosecone 40 at this joint. Additionally, the radius R1 of the nosecone 40 is selected to be between about 50% and 80%, of the inner radius R2 of the pipe 5 to increase the efficiency of the vanes 22 in creating fluid pinch points that effectively cut stringy material, as is described in more detail hereinafter. In the preferred embodiment, the radius R1 of the nosecone 40 is about 66% of the inner radius R2 of the pipe 5.

FIGS. 2 and 3B illustrate how the impeller 30 is connected to the drive shaft 26 by means of a steel mounting collar 52 having an annular plate 53a at one end and a tubular collar 53b at an opposite end. The annular plate 53 is fastened to the mounting plate 36 by means of a circular arrangement of bolts 53c. The tubular collar 53b circumscribes the drive shaft 26 as shown in FIG. 2. A compression fitting 54 circumscribes and compresses the tubular collar 53b against the drive shaft 26 upon the tightening of a second circular arrangement of bolts 56. The use of such a steel mounting collar 52 in combination with a compression fitting 54 advantageously distributes the stress applied to the aluminum hub 32 of the impeller 30 by the drive shaft 26 when the drive motor 24 is actuated, thereby avoiding the generation of localized stresses on the aluminum hub 32 that can result in premature wear and deformation at the shaft/hub interface.

The impeller assembly 20 further includes a stationary bushing housing 60, best seen in FIG. 2, which rotatably mounts the impeller 30 and nosecone 40 within the pipe 5. The bushing housing 60 has cylindrical rear and front hub portions 62a and 62b that are rigidly interconnected to one another. The interior of the rear hub portion 62a includes a centrally disposed bore 64 which conducts the drive shaft 26. Radially extending spider vanes 66a, 66b and 66c (the last vane not being shown) rigidly connect the cylindrical rear hub portion 62a to the interior wall of the pipe 5. While not evident in FIG. 2, vanes 66a, 66b and 66c are uniformly spaced 120° from one another. Like the rear hub portion 62a, the front hub portion 62b also includes a centrally disposed bore 70 for conducting the drive shaft 26. However, the bore 70 contains a bushing holder 72 which in turn circumscribes a tubular bushing 74 that journals the drive shaft 26. It should be noted that there is an annular space 76 between the interior surface of the impeller hub 32 and the exterior surface of the front hub portion 62b that allows the hub 32 to rotate freely around the front hub portion 62b during operation of the pump assembly 1.

Figure 4A:
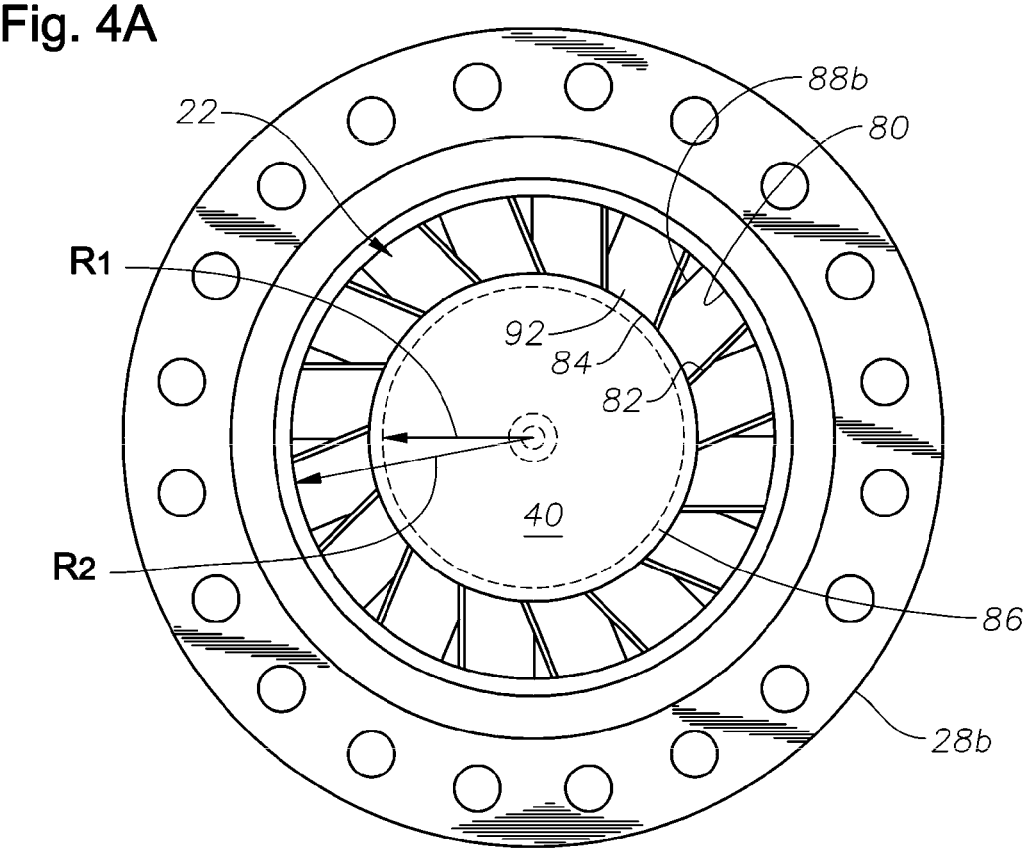
FIG. 4A is a front view of the pump assembly shown in FIG. 1 along the line 4A-4A with the impeller and nosecone illustrated in phantom to better illustrate the guide vanes.
Figure 4B:
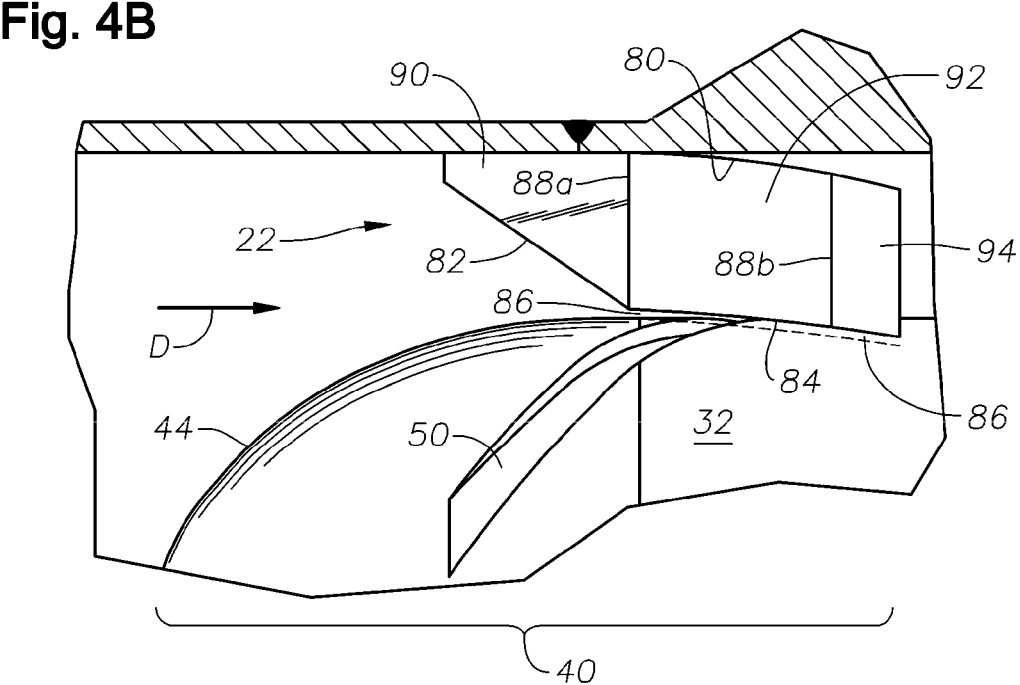
FIG. 4B is an enlarged side view of one of the guide vanes of the invention, illustrating in particular the radial gap between the front edge of the guide vane and the surface of the nosecone.
Figure 5:
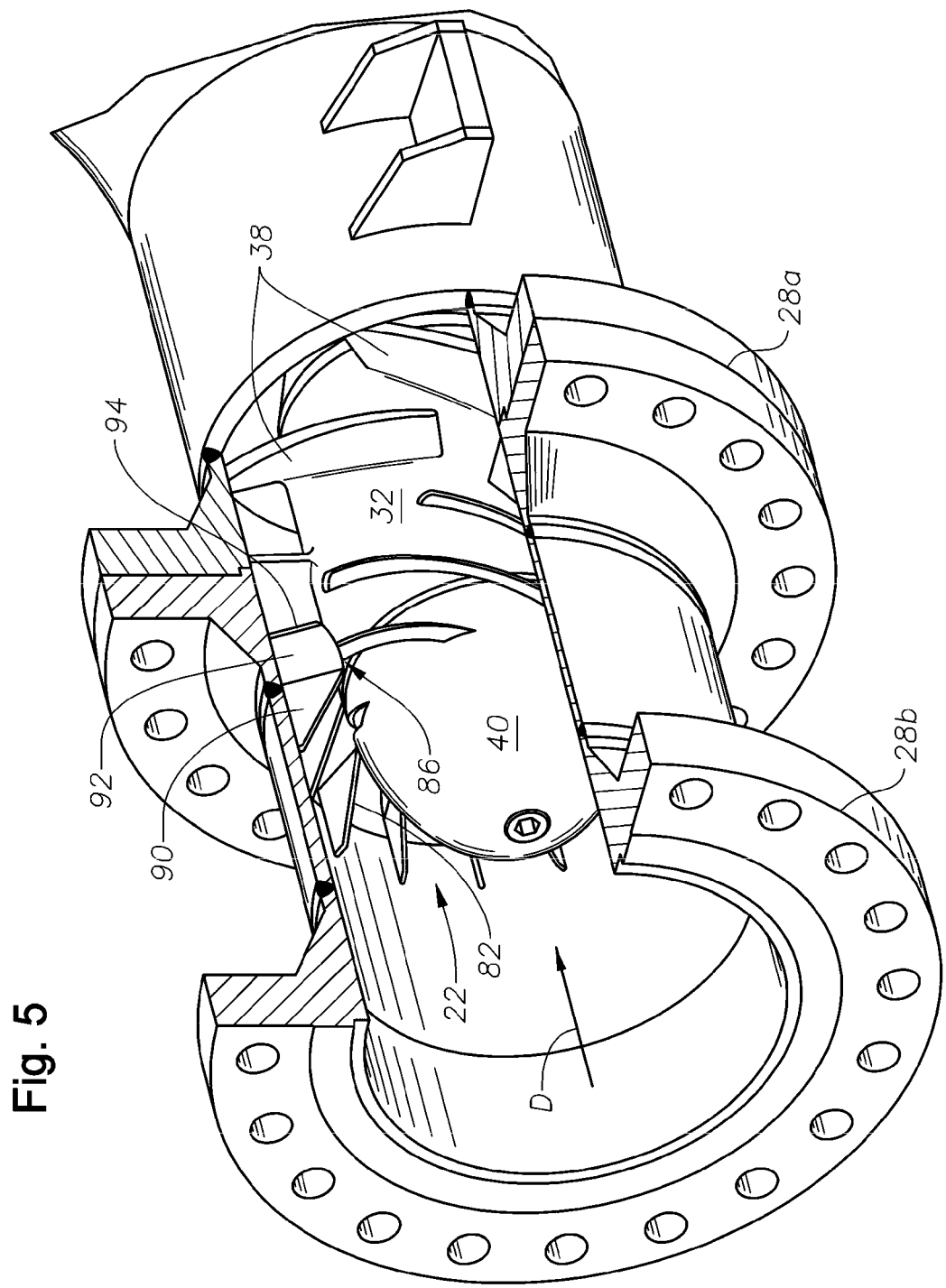
FIG. 5 is a perspective view of the flow pump assembly as it appears installed in one of the horizontal pipes of a loop reactor.

With reference to FIGS. 2, 4A and 4B, each of the stationary guide vanes 22 that surround the nosecone 40 of the impeller assembly 20 includes a back edge 80 that is welded into the inner surface of the pipe 5, a tapered leading edge 82 that faces the flow of fluid slurry through the pipe 5, and a front edge 84 that is radially spaced apart a short distance from the outer surface of the nosecone 40 to form a radial gap 86 between the vanes 22 and the nosecone 40. The leading edge 82 of each the stationary vanes is preferably straight and tapered between about 15° and 60° relative to a central axis of the pipe, and more preferably between about 20° and 30° with respect to this axis. The radial extent of the gap between the nosecone and the free ends of the vanes is preferably less than about three sixteenths (0.1875) inches (4.7 mm), and preferably more than about one sixteenth (0.0625) inches (1.6 mm). Preferably, the radial gap 86 is uniform throughout the length of the front edge 84 of each of the vanes. More preferably, the radial gap is only 1.0 inch (25.4 mm) or less, more preferably 0.75 inches (19.1 mm) or less, more preferably 0.5 inches (12.7 mm) or less, more preferably 0.25 inches (6.4 mm) or less, more preferably 0.125 inches (3.2 mm) or less in order to more effectively cut stringy material that lodges between the front edges 84 of the vanes 22 and the outer surface of the nosecone 40, as will be described in more detail hereinafter. Each of the vanes 22 is further bent along lines 88a and 88b in order to impart a counterclockwise spin to the fluid slurry flowing in the direction D toward the leading edges 82 of the vanes. The bends 88a, 88b define front, middle and rear portions 90, 92, and 94 of each of the vanes, respectively.

The operation of the flow pump assembly 1 of the invention may best be understood with reference to FIGS. 2, 4A, 4B and 5. Upon actuation, the drive motor 24 rotates the drive shaft 26 in a clockwise direction as viewed from FIG. 4A. Both the impeller hub 32 and the nosecone 40 rotate along with the shaft 26 due to their respective connections thereto via the frustro-conical mounting plate 36 and the mounting bolt 48. The resulting clockwise rotation of the impeller hub 32 induces a flow in the fluid slurry in the direction D. The angling of the vanes 22 at the bends 88a, 88b imparts a counterclockwise spin to the fluid slurry just before it engages the clockwise impeller blades 38, thereby advantageously increasing flow velocity of the slurry.

As fluid slurry enters the guide vanes 22 of the flow pump assembly, much of any stringy material present in the slurry will impinge upon the tapered leading edges 82 of the vanes, which in turn will guide such stringy material into the radial gaps 86 between the front edges 84 of the vanes 22 and the outer surface of the nosecone 40. The radial gaps 86 define fluidic pinch points which push the stringy material against the rotating surface of the nosecone 40, where the spiral grooves 50 operate like drill flutes to drag the stringy material under one or more of the front edges 84 of the vanes 22. The resulting compressive and shearing forces effectively shred the stringy material into small pieces which do not clog or foul the impeller assembly 20 of the flow pump assembly 1. Additionally, the 66% relative size of the radius R1 of the nosecone 40 to the radius R2 of the inner wall of the pipe, coupled with the bullet-like shape of the rounded front portion 44 of the nosecone 40 effectively focuses the flow of the fluid slurry into the leading tapered edges 82 of the guide vanes 22, thereby increasing flow velocity in this area of the pump assembly 1 and thereby increasing the efficacy of the fluid pinch points defined in the gaps 86 in compressing stringy material into the spiral grooves 50.

When numerical lower limits and numerical upper limits are listed herein, ranges from any lower limit to any upper limit are contemplated. While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

The invention has been described above with reference to numerous embodiments and specific examples. Many variations will suggest themselves to those skilled in this art in light of the above detailed description. All such obvious variations are within the full intended scope of the appended claims.

Other embodiments of the invention include:

Embodiment 1. A clog resistant pump assembly particularly adapted for circulating fluid slurry through the pipes of a loop reactor, comprising:

an impeller rotatably mounted in a pipe of said reactor that generates a flow of fluid slurry through said reactor pipes, said impeller having a hub and plurality of blades radially extending from said hub;

a nosecone protruding in an upstream direction in front of said blades that rotates relative to said pipe; and at least one stationary guide vane connected to the reactor pipe upstream of the impeller blades and having a free end radially spaced apart from said nosecone to define a gap therebetween that forms a fluidic pinch point that cuts stringy material entering said gap.

Embodiment 2. The pump assembly defined in embodiment 1, wherein said stationary guide vane is shaped to direct stringy material into said gap.

Embodiment 3. The pump assembly defined in embodiments 1 or 2, wherein said stationary guide vane includes a tapered leading edge that directs stringy material entrained in said flow of fluid slurry into said gap.

Embodiment 4. The pump assembly defined in embodiment 3, wherein the tapered leading edge of the stationary vane includes a portion that is substantially straight and tapered between about 20° and 40° relative to an axis of rotation of said pipe.

Embodiment 5. The pump assembly defined in any one of the preceding embodiments, wherein a radial extent of said gap is less than about 0.5 inches (12.7 mm).

Embodiment 6. The pump assembly defined in any one of the preceding embodiments, further comprising a drive shaft, wherein both said impeller and said nosecone are connected to said drive shaft.

Embodiment 7. The pump assembly defined in any one of the preceding embodiments, wherein said stationary guide vanes are shaped to impart a rotation direction to said fluid slurry that is opposite in direction to a rotation direction of said impeller blades.

Embodiment 8. The pump assembly defined in any one of the preceding embodiments, wherein said nosecone includes a portion of said impeller hub upstream of said impeller blades and a rounded front portion, and wherein said nosecone includes grooves on a surface opposite from said free ends of said vanes to increase the effectiveness of the fluidic pinch point in cutting stringy material entering said gap.

Embodiment 9. The pump assembly defined in embodiment 8, wherein said surface of said nosecone opposite from said vanes is substantially cylindrical, and said grooves are helically oriented on said substantially cylindrical surface in a direction that pulls stringy material through said fluidic pinch point when said impeller rotates.

Embodiment 10. The pump assembly defined in any one of the preceding embodiments, wherein said nosecone includes a substantially cylindrical surface opposite to said free ends of said vanes, and a radial extent of said nosecone is at least half of a maximum radial extent of said impeller.

Embodiment 11. A clog resistant pump assembly particularly adapted for circulating fluid slurry in the pipes of a loop reactor, comprising:

an impeller rotatably mounted in a pipe of said reactor that generates a flow of fluid slurry through said reactor pipes, said impeller having a hub and plurality of blades radially extending from said hub;

a nosecone protruding in an upstream direction in front of said blades that rotates with said blades; and a plurality of stationary guide vanes connected to the pipe upstream of the impeller blades, wherein said blades circumscribe and are radially spaced apart from said nosecone to define gaps between said nosecone and free ends of said vanes that provide fluidic pinch points for cutting stringy material flowing through said gaps, and wherein said stationary guide vanes include tapered leading edges that direct said stringy material into said gap.

Embodiment 12. The pump assembly defined in embodiment 11, wherein a radial extent of said gap is less than about 0.125 inches (3.2 mm).

Embodiment 13. The pump assembly defined in embodiments 11 or 12, wherein said stationary guide vanes are shaped to impart a spin direction to said fluid slurry that is opposite in direction to a spin direction of said impeller blades.

Embodiment 14. The pump assembly defined in any one of embodiments 11-13, wherein said nosecone includes grooves on a surface opposite from said free ends of said vanes to increase the effectiveness of the fluidic pinch point in cutting stringy material in said slurry.

Embodiment 15. The pump assembly defined in embodiment 14, wherein said surface of said nosecone opposite from said vanes is substantially cylindrical, and said grooves are helically oriented on said substantially cylindrical surface in a direction that pulls stringy material through said fluidic pinch point when said impeller and nosecone rotate.

Embodiment 16. The pump assembly defined in any one of embodiments 11-15, wherein said nosecone includes a substantially cylindrical portion opposite to said free ends of said vanes, and a radial extent of said nosecone is at least half of a maximum radial extent of said impeller.

Embodiment 17. The pump assembly defined in any one of embodiments 11-16, wherein the leading edges of the stationary vanes include a first portion that is substantially straight and tapered between about 15° and 60° relative to an axis of rotation of said pipe.

Embodiment 18. The pump assembly defined in any one of embodiments 11-17, further comprising a drive shaft coupled at one end to both said hub of said impeller and said nosecone, and coupled at an opposite end to a drive motor.

Embodiment 19. The pump assembly defined in embodiment 18, wherein said housing is located adjacent to an elbow in said loop reactor pipe, and wherein said drive motor is located outside of said pipe and a mid-portion of said drive shaft extends through said pipe.

Embodiment 20. The pump assembly defined in any one of embodiments 11-19, wherein said nosecone includes an annular base portion and a distal tapered portion that protrudes upstream away from the cylindrical portion, and wherein the outer diameters of the impeller hub and the base portion of the nosecone are substantially equal.

Embodiment 21. A loop reactor comprising the pump assembly defined in any one of the preceding claims.

Embodiment 22. A process for producing polymer comprising:

polymerizing in liquid diluent at least one monomer in a loop reactor to produce a slurry of polymer solids and under certain conditions stringy material;

inducing flow of the slurry in the loop reactor using a pump assembly comprising:

an impeller rotatably mounted in a pipe of the reactor having blades that generate a flow of fluid slurry through the pipe, a nosecone protruding in an upstream direction in front of the impeller blades that rotates along with the blades;

a plurality of stationary guide vanes connected to the housing upstream of the impeller blades and having free ends that are radially spaced apart from the nosecone, wherein the stationary vanes have leading edges shaped to direct any stringy material into the radial gaps between the free ends of the stationary vanes and the rotating nose cone; and shredding any stringy material generated during the polymerization process through shearing force generated by the relative motion between the stationary free ends of the vanes and the rotating nosecone.

The invention claimed is:

1. A clog resistant pump assembly particularly adapted for circulating fluid slurry through the pipes of a loop reactor, comprising:

an impeller rotatably mounted in a pipe of said reactor that generates a flow of fluid slurry through said reactor pipes, said impeller having a hub and plurality of blades radially extending from said hub;

a nosecone protruding in an upstream direction in front of said blades that rotates relative to said pipe; and at least one stationary guide vane connected to the reactor pipe upstream of the impeller blades and having a free end radially spaced apart from said nosecone to define a gap therebetween that forms a fluidic pinch point that cuts stringy material entering said gap.

2. The pump assembly defined in claim 1, wherein said stationary guide vane is shaped to direct stringy material into said gap.

3. The pump assembly defined in claim 2, wherein said stationary guide vane includes a tapered leading edge that directs stringy material entrained in said flow of fluid slurry into said gap.

4. The pump assembly defined in claim 3, wherein the tapered leading edge of the stationary vane includes a portion that is substantially straight and tapered between about 20° and 40° relative to an axis of rotation of said pipe.

5. The pump assembly defined in claim 1, wherein a radial extent of said gap is less than about 0.5 inches (12.7 mm).

6. The pump assembly defined in claim 1, further comprising a drive shaft, wherein both said impeller and said nosecone are connected to said drive shaft.

7. The pump assembly defined in claim 1, wherein said stationary guide vanes are shaped to impart a rotation direction to said fluid slurry that is opposite in direction to a rotation direction of said impeller blades.

8. The pump assembly defined in claim 1, wherein said nosecone includes a portion of said impeller hub upstream of said impeller blades and a rounded front portion, and wherein said nosecone includes grooves on a surface opposite from said free ends of said vanes to increase the effectiveness of the fluidic pinch point in cutting stringy material entering said gap.

9. The pump assembly defined in claim 8, wherein said surface of said nosecone opposite from said vanes is substantially cylindrical, and said grooves are helically oriented on said substantially cylindrical surface in a direction that pulls stringy material through said fluidic pinch point when said impeller rotates.

10. The pump assembly defined in claim 1, wherein said nosecone includes a substantially cylindrical surface opposite to said free ends of said vanes, and a radial extent of said nosecone is at least half of a maximum radial extent of said impeller.

11. A clog resistant pump assembly particularly adapted for circulating fluid slurry in the pipes of a loop reactor, comprising:

an impeller rotatably mounted in a pipe of said reactor that generates a flow of fluid slurry through said reactor pipes, said impeller having a hub and plurality of blades radially extending from said hub;

a nosecone protruding in an upstream direction in front of said blades that rotates with said blades; and a plurality of stationary guide vanes connected to the pipe upstream of the impeller blades, wherein said blades circumscribe and are radially spaced apart from said nosecone to define gaps between said nosecone and free ends of said vanes that provide fluidic pinch points for cutting stringy material flowing through said gaps, and wherein said stationary guide vanes include tapered leading edges that direct said stringy material into said gap.

12. The pump assembly defined in claim 11, wherein a radial extent of said gap is less than about 0.25 inches (6.4 mm).

13. The pump assembly defined in claim 11, wherein said stationary guide vanes are shaped to impart a spin direction to said fluid slurry that is opposite in direction to a spin direction of said impeller blades.

14. The pump assembly defined in claim 11, wherein said nosecone includes grooves on a surface opposite from said free ends of said vanes to increase the effectiveness of the fluidic pinch point in cutting stringy material in said slurry.

15. The pump assembly defined in claim 14, wherein said surface of said nosecone opposite from said vanes is substantially cylindrical, and said grooves are helically oriented on said substantially cylindrical surface in a direction that pulls stringy material through said fluidic pinch point when said impeller and nosecone rotate.

16. The pump assembly defined in claim 11, wherein said nosecone includes a substantially cylindrical portion opposite to said free ends of said vanes, and a radial extent of said nosecone is at least half of a maximum radial extent of said impeller.

17. The pump assembly defined in claim 11, wherein the leading edges of the stationary vanes include a first portion that is substantially straight and tapered between about 15° and 60° relative to an axis of rotation of said pipe.

18. The pump assembly defined in claim 11, further comprising a drive shaft coupled at one end to both said hub of said impeller and said nosecone, and coupled at an opposite end to a drive motor.

19. The pump assembly defined in claim 18, wherein said housing is located adjacent to an elbow in said loop reactor pipe, and wherein said drive motor is located outside of said pipe and a mid-portion of said drive shaft extends through said pipe.

20. The pump assembly defined in claim 11, wherein said nosecone includes an annular base portion and a distal tapered portion that protrudes upstream away from the cylindrical portion, and wherein the outer diameters of the impeller hub and the base portion of the nosecone are substantially equal.

21. A loop reactor comprising the pump assembly defined in claims 1 or 11.

22. A process for producing polymer comprising:
polymerizing in liquid diluent at least one monomer in a loop reactor to produce a slurry of polymer solids and under certain conditions stringy material;
inducing flow of the slurry in the loop reactor using a pump assembly comprising:
an impeller rotatably mounted in a pipe of the reactor having blades that generate a flow of fluid slurry through the pipe;
a nosecone protruding in an upstream direction in front of the impeller blades that rotates along with the blades;
a plurality of stationary guide vanes connected to the housing upstream of the impeller blades and having free ends that are radially spaced apart from the nosecone, wherein the stationary vanes have leading edges shaped to direct any stringy material into the radial gaps between the free ends of the stationary vanes and the rotating nose cone; and
shredding any stringy material generated during the polymerization process through shearing force generated by the relative motion between the stationary free ends of the vanes and the rotating nosecone.

* * * * *